United States Patent [19]
Draga

[11] Patent Number: 5,297,996
[45] Date of Patent: Mar. 29, 1994

[54] ROLLING OR CONVOLUTED BOOT FOR A CONSTANT VELOCITY UNIVERSAL JOINT WITH PRESSURE BALANCE BEING ENSURED IN THE JOINT SPACE

[75] Inventor: Eckhard Draga, Dietzenbach, Fed. Rep. of Germany

[73] Assignee: Lohr & Bromkamp GmbH, Offenbach am Main, Fed. Rep. of Germany

[21] Appl. No.: 778,572

[22] Filed: Oct. 17, 1991

[30] Foreign Application Priority Data

Oct. 19, 1990 [DE] Fed. Rep. of Germany ....... 4033275

[51] Int. Cl.⁵ ................................................ F16D 3/84
[52] U.S. Cl. .................. 464/175; 277/212 FB; 464/173
[58] Field of Search ................. 464/173, 175; 277/212 FB

[56] References Cited

U.S. PATENT DOCUMENTS

| | | | |
|---|---|---|---|
| 4,210,002 | 7/1980 | Dore | 464/175 |
| 4,224,808 | 9/1980 | Grehrke | 464/175 |
| 4,392,838 | 7/1983 | Welschof et al. | 464/175 |
| 4,556,400 | 12/1985 | Krüde et al. | 277/212 FB |
| 4,559,025 | 12/1985 | Dore | 464/175 |

FOREIGN PATENT DOCUMENTS

| | | | |
|---|---|---|---|
| 1347809 | 11/1963 | France | 464/175 |
| 2257042 | 8/1975 | France | 464/175 |
| 2414144 | 9/1979 | France | 464/175 |

*Primary Examiner*—Daniel P. Stodola
*Attorney, Agent, or Firm*—Harness, Dickey & Pierce

[57] ABSTRACT

A rolling or convoluted boot for a constant velocity universal joint has at least one pressure balancing aperture (19, 19a) located in a pressure balancing region (13, 13a). When the shaft (12) is in a stationary position, the pressure balancing region (13) tightly adjoining the shaft (12), during shaft rotation, the pressure balancing region radially lifts off the shaft as a function of the speed or pressure differential. Thus, the boot balances pressure between the joint space and the surrounding atmosphere.

21 Claims, 3 Drawing Sheets

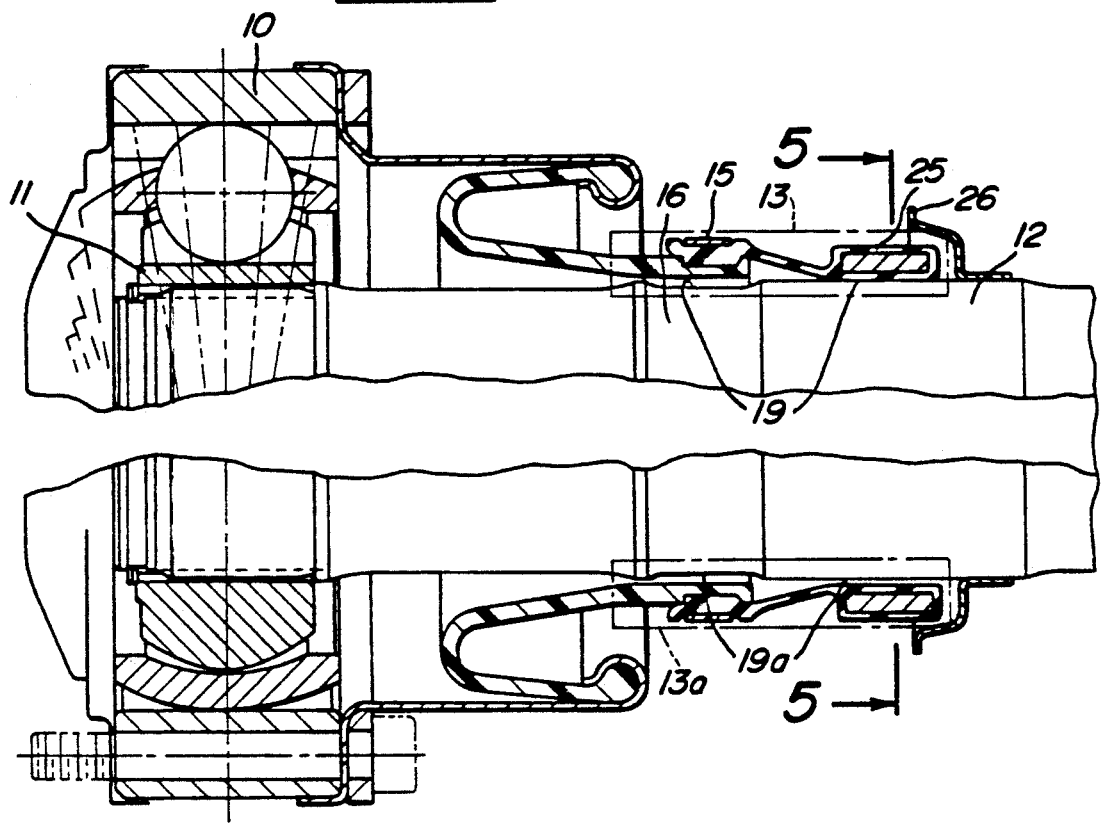
Fig-4
Fig-4a
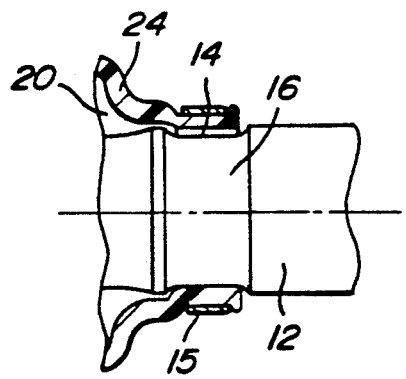
Fig-1
PRIOR ART
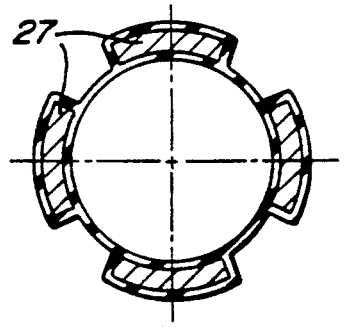
Fig-5

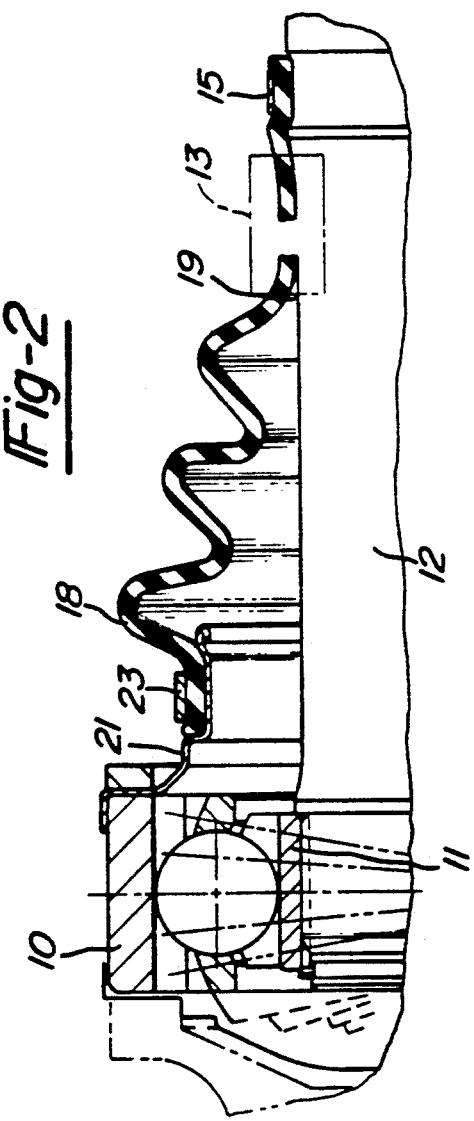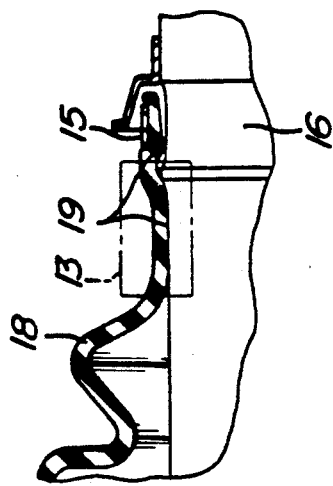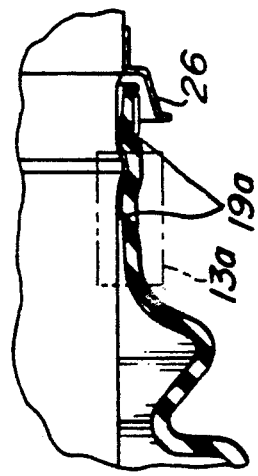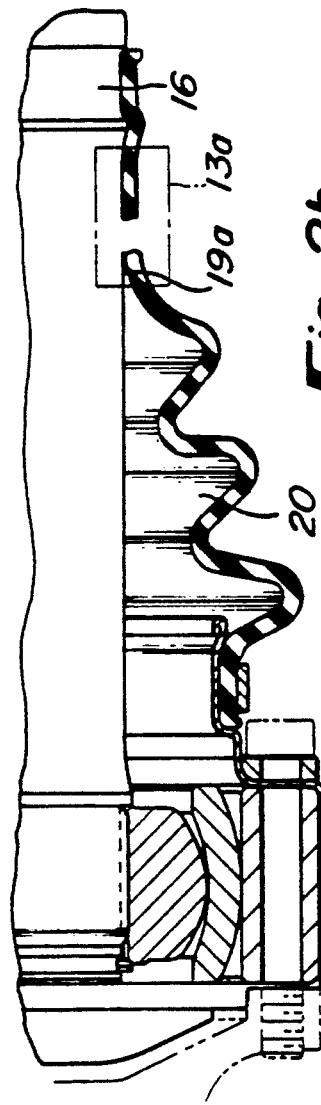

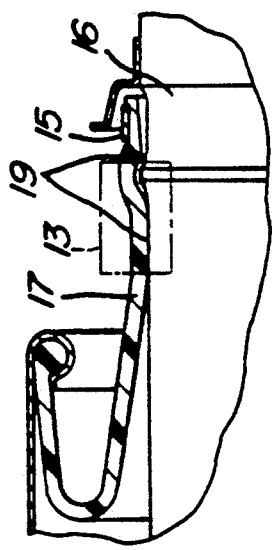
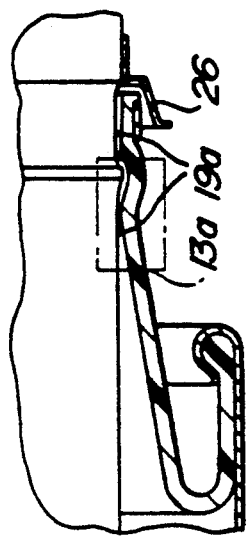
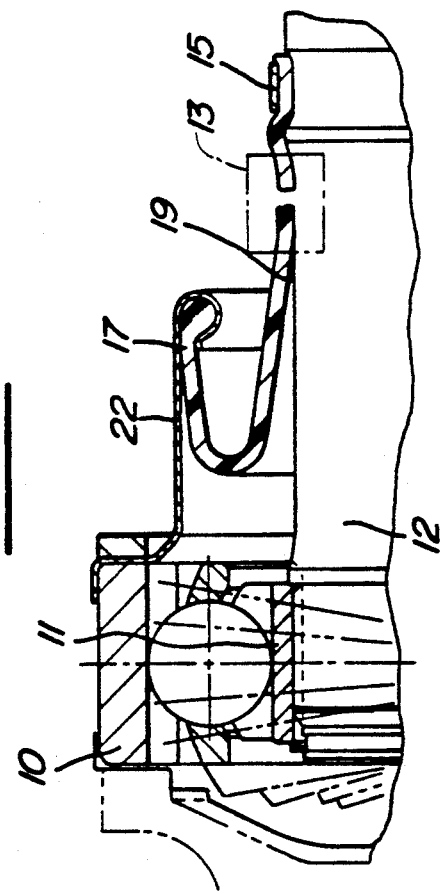
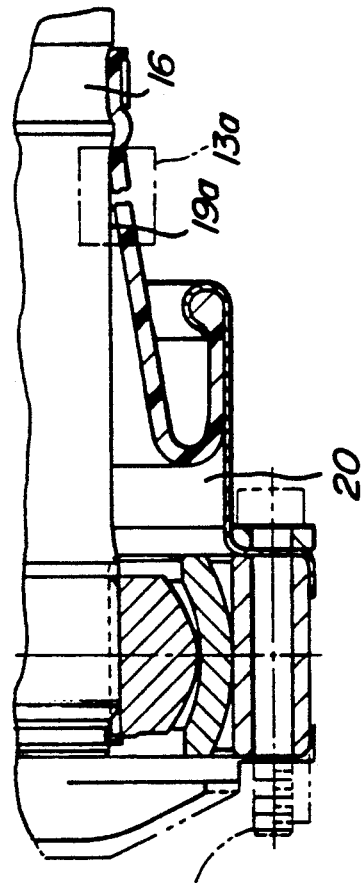

ROLLING OR CONVOLUTED BOOT FOR A CONSTANT VELOCITY UNIVERSAL JOINT WITH PRESSURE BALANCE BEING ENSURED IN THE JOINT SPACE

BACKGROUND AND SUMMARY OF THE INVENTION

The invention relates to a rolling or convoluted boot for a constant velocity universal joint. The constant velocity joint includes an outer joint part and an internal inner joint part with a rotatable shaft. A joint space is formed between the boot and joint parts. The space is sealed towards the outside by the rolling or convoluted boot. Pressure is balanced between the joint space and the surrounding atmosphere by the boot.

Constant velocity universal joints transmit torque in the drive shafts of motor vehicles engine-driven amphibian vehicles and machinery. The joints include a permanent amount of lubricating grease. The joint space is sealed by a convoluted or rolling boot whose purpose is to prevent escape of lubricant and entrance of foreign particles, such as dust or water.

As a result of the heat caused by friction in the course of the operation of the joint, the joint temperature increases, which, in turn, causes an increase in the pressure in the joint space sealed by the convoluted or rolling boot. This increase in pressure leads to boot deformation and, in extreme cases, to the destruction of the boot. To prevent destruction, it is essential to accurately balance the pressure between the joint space and the surrounding atmosphere. Normally, this pressure balance is achieved via an axially extending, permanently open channel. The channel is integrated into the small boot diameter and extends between the boot and the shaft. Such a pressure balancing assembly has proved itself. However, with wading or amphibian vehicles and with road vehicles driving on wet surfaces, there is a risk that as a result of the permanently open aperture, water or dirt may enter into the joint space.

It is the object of the present invention to provide a rolling or convoluted boot for constant velocity universal joints of the initially mentioned type in which a pressure balancing aperture may be closed. According to a first solution, the objective is achieved by a rolling or convoluted boot with at least one pressure balancing aperture located in a pressure balancing region. The pressure balancing region is adapted to be tightly adjoining the shaft when the shaft is at rest, and to lift off radially during shaft rotation as a function of the rotational speed or being supported by a pressure differential between the sealed area and the ambient pressure. An equivalent second solution provides the rolling or convoluted boot with at least one pressure balancing aperture located in a pressure balancing region, with a tightly adjoining sealing element adapted to lift off the shaft during shaft rotation as a function of the speed or being supported by a pressure differential between the sealed area and the ambient pressure. The sealing element is pulled over, or integrally formed with the pressure balancing region.

By introducing these measures it is possible to provide a constant velocity universal joint in which, at low joint speed occurring when the vehicle wades or drives through off-highway territory or is completely stationary, e.g. when the vehicle is afloat, the pressure balancing region tightly rests against and seals the shaft. At higher speeds which occur under normal road conditions the centrifugal force of the boot increases and the sealing element and the boot or the sealing element is lifted off the shaft in its pressure balancing region. At the same time, the centrifugal force prevents water spray or foreign particles from entering the joint space. These measures in accordance with the invention are not restricted to being applied to constant velocity universal joints; they may be applied to all rotating shafts which are surrounded by a boot and which require pressure balancing measures.

In order to ensure that the pressure balancing apertures open and close without fail and as a function of the joint speed and pressure differential without being adversely affected by the grease filling, it is proposed that the pressure balancing region be located axially adjoining the boot fixing region. In the case of the first solution, the pressure balancing region itself effects opening and closing, whereas in the second solution, opening and closing is effected exclusively by the sealing element.

The sealing element functions independently of the boot design and may therefore be used for joints fitted with a convoluted boot and for joints fitted with a rolling boot. It is irrelevant whether the sealing element is connected to the convoluted or rolling boot by a tensioning strip or whether it is a fixed part of the boots. It is advantageous for replacement that the sealing element be designed as a separate component.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 1 is a partial sectional view of a conventional pressure balancing aperture axially extending between the shaft and the boot fixing means.

FIG. 3 is a longitudinal sectional view of a constant velocity universal joint having a joint space sealed towards the outside by a rolling boot in accordance with the invention.

FIG. 3a is a longitudinal sectional view like FIG. 3 with an axially extending pressure balancing aperture in accordance with the invention.

FIG. 3b is a longitudinal sectional view like FIG. 3 of a constant velocity universal joint having a joint space sealed towards the outside by a rolling boot in accordance with the invention in an operative position.

FIG. 3c is a longitudinal sectional view like FIG. 3a with an axially extending pressure balancing aperture in accordance with the invention in an operative position.

FIG. 4 is a longitudinal sectional view of a constant velocity universal joint with an additional sealing element in accordance with the present invention.

FIG. 4a is a longitudinal sectional view like FIG. 4 of a constant velocity universal joint with an additional sealing element in accordance with the invention in an operative position.

FIG. 5 is a sectional view of FIG. 4 along line 5—5 thereof.

DETAILED DESCRIPTION OF THE PREFERRED EMBODIMENT OF THE INVENTION

Figure 2:
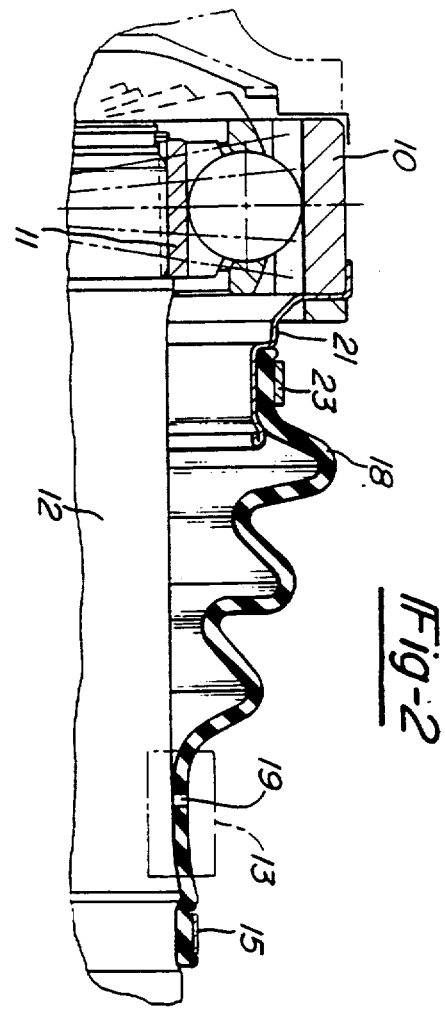
FIG. 2 is a longitudinal section view of a constant velocity universal joint having a joint space sealed by a convoluted boot in accordance with the invention.
Figure 2B:
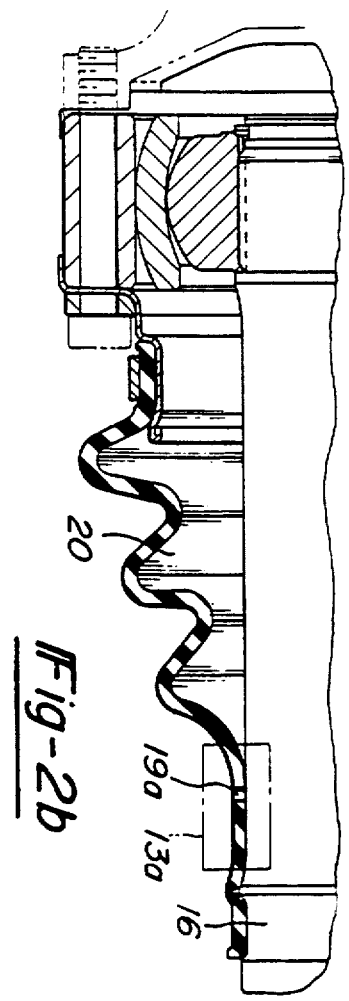
FIG. 2b is a longitudinal sectional view like FIG. 2 of a constant velocity universal joint having a joint space sealed by a convoluted boot in accordance with the invention in an operative position.

In the case of the conventional design as illustrated in FIG. 1, a boot 24 is fixed on a shaft 12 in a fixing region 16 by a boot fixing means, for example a tensioning strip or a continuous tensioning ring 15. For this purpose, the shaft 12 is provided with a shallow groove. The fixing region 16 comprises at least one axially extending pressure balancing channel 14 connecting the joint space 20 with the surrounding atmosphere. When the joint space 20 heats up and when, as a result of the expansion of the lubricant (not illustrated) contained in the joint space 20, the pressure increases, air may escape through the permanently open pressure balancing channel 14. When the temperature drops and the volume contracts as a result, atmospheric air may again flow into the joint space 20. However, if such a shaft 12 comes into contact with water, when the vehicle drives slowly or is stationary, the pressure balancing channel 14 cannot be closed, thus enabling water and other foreign particles, such as sand, to enter the joint space 20. Such dirt leads to increased wear and abrasion as well as rust and thus shortens service life of the constant velocity joint.

Figure 2A:
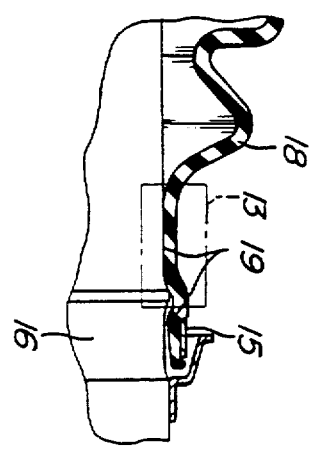
FIG. 2a is a longitudinal sectional view like that of FIG. 2 with an axially extending pressure balancing aperture in accordance with the invention.
Figure 2C:
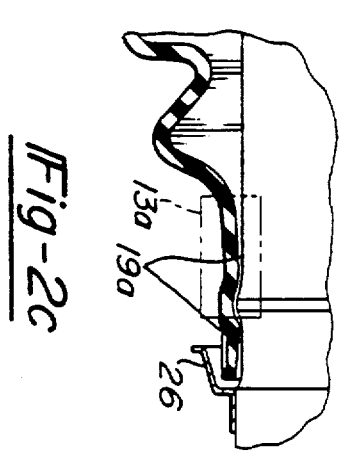
FIG. 2c is a longitudinal sectional view like FIG. 2a with an axially extending pressure balancing aperture in accordance with the invention in an operative position.

The embodiments as illustrated in FIGS. 2 and 2a comprise constant velocity universal joints each having an outer joint part 10 and an inner joint part 11. The inner joint part 11 is connected via splines to a rotatable shaft 12. The joint space 20 is sealed towards the outside by a rotational convoluted boot 18. At the first or joint end, the convoluted boot 18 has a large diameter, and via a tensioning strip 23 it is connected to a plate metal cap 21 fixed to the outer joint part 10. At the second or shaft end, the convoluted boot 18 has a smaller diameter and, in the fixing region 16, it is non-rotatingly connected to the shaft 12 via a tensioning strip 15. Axially adjacent the second end is a pressure balancing region 13 which adjoins the fixing region 16. The pressure balancing region 13 of the convoluted boot 18 includes a pressure balancing aperture 19. When the shaft 12 is at rest or stationary, aperture 19 is closed as a result of the pressure balancing region 13 resting against the shaft 12 as seen at the top of the shaft in FIGS. 2 and 2a. The pressure balancing aperture 19 may extend radially as seen in FIG. 2 or axially as seen in FIG. 2a.

As rotation speed of the shaft increases, the centrifugal forces likewise increase and act on the convoluted boot 18. As a result of the centrifugal forces the balancing region lifts off the shaft 12, to give it the shape 13a, with the pressure balancing aperture being opened in the position given the reference numeral 19a as seen at the bottom of the shaft in FIGS. 2 and 2a. During the subsequent rise in temperature, the pressure balance between the joint space 20 and the surrounding atmosphere is ensured. In FIG. 2a, an additional centrifugal ring 26 prevents dirt and water from entering through the axially extending pressure balancing aperture when the vehicle negotiates off-highway territory and wet road surfaces. When the speed of the constant velocity universal joint decreases, the centrifugal forces which act on the convoluted boot 18 also decrease and the pressure balancing region 13 again rests tightly against the shaft 12. Thus, the pressure balancing aperture 19 is closed again.

With the embodiments as illustrated in FIGS. 3 and 3a, the joint space 20 is sealed to the outside by the rolling boot 18. The large diameter of the boot 17 is rolled into a plate metal cap 22, which is connected to the outer joint part 10. As in the previous cases, the inner joint part 11 is connected to a shaft 12. Again, the rolling boot 17 at is smaller diameter, has a pressure balancing region 13, pressure balancing apertures 19 adjoining the fixed region 16. This rolling boot 17, too, with increased speed, lifts off the shaft 12 to achieve position 13a with the pressure balancing apertures being released in position 19a as seen at the bottom of the shaft of FIG. 3. When the speed decreases, the rolling boot 17 tightly rests against the shaft 12, thereby closing the pressure balancing apertures 19 in the pressure balancing region 13 as seen at the top of the shaft in FIG. 3.

The centrifugal ring 26 as illustrated in FIG. 3a prevents dirt and water from entering through the axially extending pressure balancing aperture when the vehicle drives on wet road surfaces or through off-highway territory.

FIG. 4 shows a constant velocity universal joint of the previously described type. A sealing element 25 made of elastomer tightly encloses a convoluted or rolling boot in the fixing region 16. Also, the sealing element 25 encloses a defined region of the shaft 12 in such a way that no foreign particles such as dust and water are able to enter the joint space through the pressure balancing channel 19. In the region surrounding the shaft 12, centrifugal weights 27 are embedded into the sealing element 25 as seen in FIG. 5. Under increased speed conditions, weights 27 cause an increase in the diameter of the sealing element 25 in the region surrounding the shaft 12. As a result, the sealing element lifts off the shaft 12 into the shape given the reference numeral 13a as seen at the bottom of the shaft in FIG. 4. As the sealing element 25 lifts off, it permits the pressure to be balanced through the ventilation channel to achieve the shape 19a. The centrifugal ring 26 prevents dirt and water from entering when the sealing element 25 is open.

While the above detailed description describes the preferred embodiment of the present invention, the invention is susceptible to modification, variation, and alteration without deviating from the scope and fair meaning of the subjoined claims.

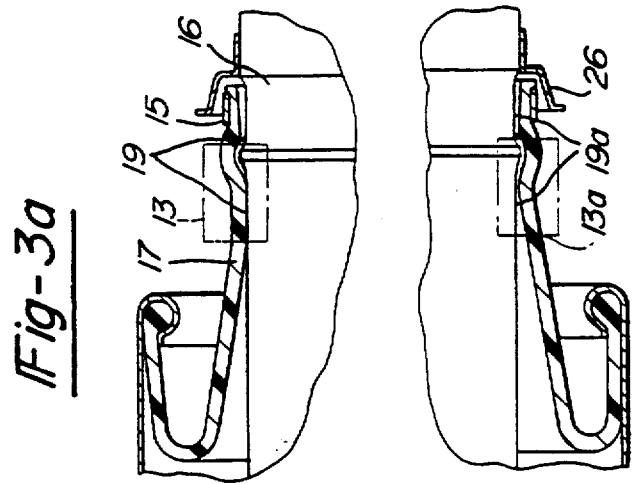
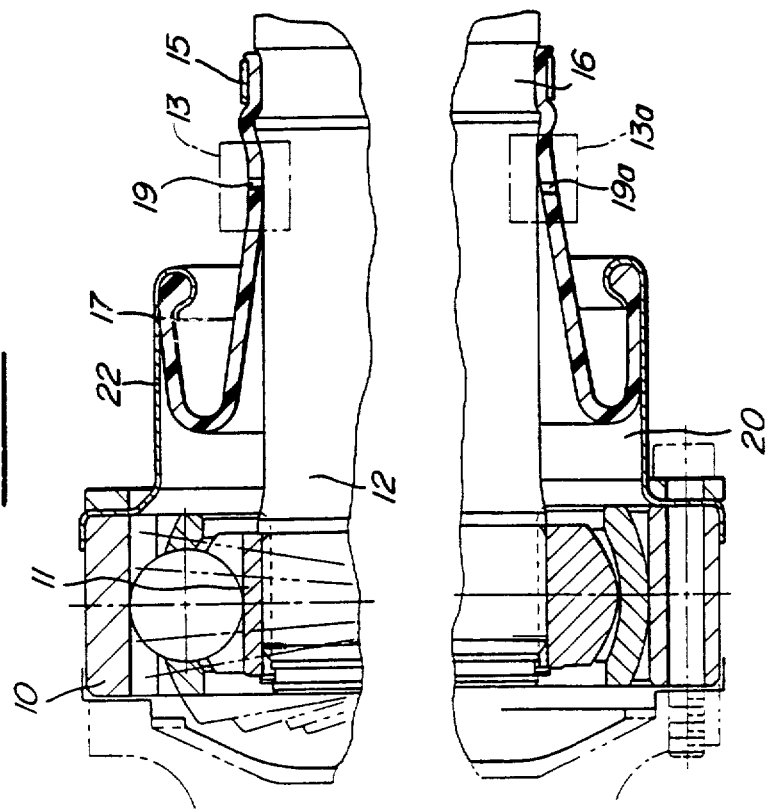

I claim:

1. A boot for a constant velocity universal joint comprising:
   a rotational member tapering from a first end to a second end, said first end adapted for coupling with an outer member of the constant velocity joint and said second end adapted to be coupled with a shaft of the constant velocity joint;
   a pressure balancing region on said member adjacent said second end, said pressure balancing region including centrifugal weights, said pressure balancing region being adapted to be tightly fit against the shaft when said shaft is at rest and being adapted to lift off of said shaft during rotation of said shaft in response to predetermined centrifugal forces when said shaft is rotated at a desired speed and returning to said tightly fit position upon removal of said centrifugal forces; and at least one pressure balancing opening located at said pressure balancing region for enabling pressure balance between a joint space covered by the boot and surrounding atmospheric pressure.

2. A boot as set forth in claim 1 wherein said pressure balancing opening is designed so as to extend radially.

3. A boot as set forth in claim 2 wherein the centrifugal weights are integrated into the pressure balancing region.

4. A boot as set forth in claim 2 wherein said boot includes a defined area in the pressure balancing region which is adapted to enclose the shaft under pretension.

5. A boot as set forth in claim 1 wherein the centrifugal weights are integrated into the pressure balancing region.

6. A boot as set forth in claim 1 further comprising a collar region adapted for fixing said boot to said shaft wherein said pressure balancing region is located so as to be axially adjoining said collar region.

7. A boot as set forth in claim 1 wherein said boot includes a defined area in the pressure balancing region which is adapted to enclose the shaft under pretension.

8. A boot as set forth in claim 1 wherein said pressure balancing opening is designed so as to extend axially.

9. A boot for a constant velocity universal joint comprising:

a rotational member tapering from a first end to a second end, said first end adapted for coupling with an outer member of the constant velocity joint and the second end adapted to be coupled with a shaft of the constant velocity joint;

a pressure balancing region on said member adjacent said second end;

at least one pressure balancing opening located at said pressure balancing region for enabling pressure balance between a joint space covered by the boot and surrounding atmospheric pressure; and a sealing means adjacent said second end for sealing said second end, said sealing means including centrifugal weights said sealing means adapted to tightly fit against said shaft at rest and adapted to lift off of the shaft during rotation of said shaft in response to predetermined centrifugal forces when said shaft is rotated at a desired speed or pressure differential and returning to said tightly fit position upon removal of said centrifugal forces.

10. A rolling or convoluted boot as set forth in claim 9 wherein the centrifugal weights are integrated into said sealing means.

11. A boot as set forth in claim 2 wherein said sealing means is separate from said pressure balancing region.

12. A boot as set forth in claim 11 further comprising a collar region adapted for fixing said boot to said shaft wherein said pressure balancing region is located so as to be axially adjoining said collar region.

13. A boot as set forth in claim 11 wherein the centrifugal weights are integrated into said sealing means.

14. A boot as set forth in claim 11 wherein said sealing means includes a defined area in the pressure balancing region which is adapted to enclose the shaft under pretension.

15. A boot as set forth in claim 9 wherein said sealing means includes a defined area in the pressure balancing region which is adapted to enclose the shaft under pretension.

16. A boot as set forth in claim 9 wherein said pressure balancing opening is designed so as to extend radially.

17. A boot as set forth in claim 16 wherein said sealing means includes a defined area in the pressure balancing region which is adapted to enclose the shaft under pretension.

18. A boot as set forth in claim 9 further comprising a collar region adapted for fixing said boot to said shaft wherein said pressure balancing region is located so as to be axially adjoining said collar region.

19. A boot as set forth in claim 9 wherein said sealing means is integral with said pressure balancing region.

20. A boot as set forth in claim 9 wherein said pressure balancing opening is designed so as to extend axially.

21. A rolling or convoluted boot for a constant velocity universal joint comprising:

a rotational member tapering from a first end to a second end, said first end adapted for coupling with an outer member of the constant velocity joint and the second end adapted to be coupled with a shaft of the constant velocity joint; and a pressure balancing region on said member adjacent said second end, said pressure balancing region including centrifugal weights, said pressure balancing region being adapted to be tightly fit against the shaft when said shaft is at rest and being adapted to lift off of said shaft during rotation of said shaft in response to predetermined centrifugal forces when said shaft is rotated at a desired speed and returning to said tightly fit position upon removal of said centrifugal forces for enabling pressure balance between a joint space covered by the boot and surrounding atmospheric pressure.

* * * * *

UNITED STATES PATENT AND TRADEMARK OFFICE
CERTIFICATE OF CORRECTION

PATENT NO. : 5,297,996

DATED : March 29, 1994

INVENTOR(S) : Eckhard Draga

It is certified that error appears in the above-indentified patent and that said Letters Patent is hereby corrected as shown below:

On the title page, item [73], "Lohr" should be --Löhr-- and item [56] "Grehrke" should be --Gehrke--.

In the Drawing, delete the drawing consisted of Figures 2,2a,2b,2c,3,3a, 3b, and 3c, and substitute therefore the Drawing Sheets, consisting of Figures 2-3c, as shown on the attached pages.

Column 1, line 58, after "or", delete "being supported by".

Column 3, line 40, "rotational" should be --cylindrical--.

Column 4, line 13, "is" should be --its--.

Column 4, line 35, "19" should be --14--.

Signed and Sealed this

Twenty-seventh Day of December, 1994

Attest:

BRUCE LEHMAN

Attesting Officer

Commissioner of Patents and Trademarks